June 1, 1926.  
A. E. SMITH  
OUTLET VALVE FOR TANK CARS  
Filed Jan. 15, 1923  
1,587,245  
2 Sheets-Sheet 1
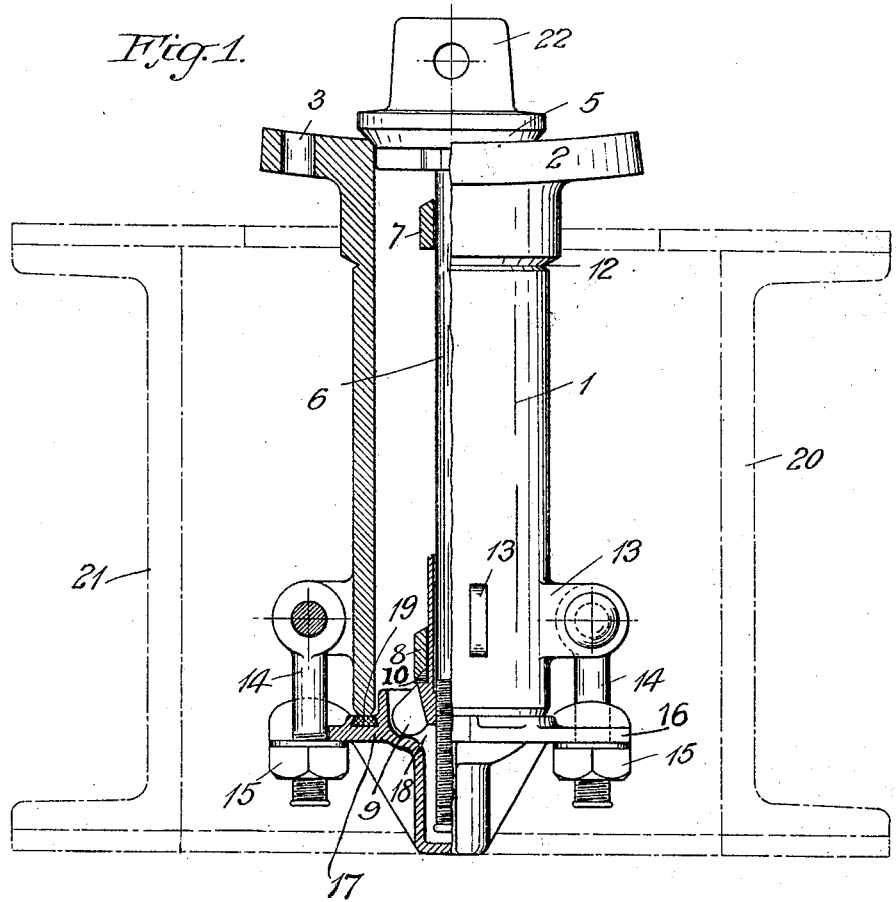

June 1, 1926.

A. E. SMITH

OUTLET VALVE FOR TANK CARS

Filed Jan. 15, 1923     2 Sheets-Sheet 2

1,587,245

INVENTOR.
Abram E. Smith
BY Gifford, Bull & Saul
ATTORNEYS.

Patented June 1, 1926.

1,587,245

UNITED STATES PATENT OFFICE.

ABRAM E. SMITH, OF NEW YORK, N. Y.

OUTLET VALVE FOR TANK CARS.

Application filed January 15, 1923. Serial No. 612,594.

My invention relates to outlet valves and is particularly useful on tank cars.

My invention will be understood by reading the following description, taken in connection with the accompanying drawings, illustrating one embodiment thereof, and in which—

Figure 1 shows the device partly in elevation and partly in section;

Figure 2 is a top plan view of the device of Fig. 1 with the valve removed;

Figure 3:
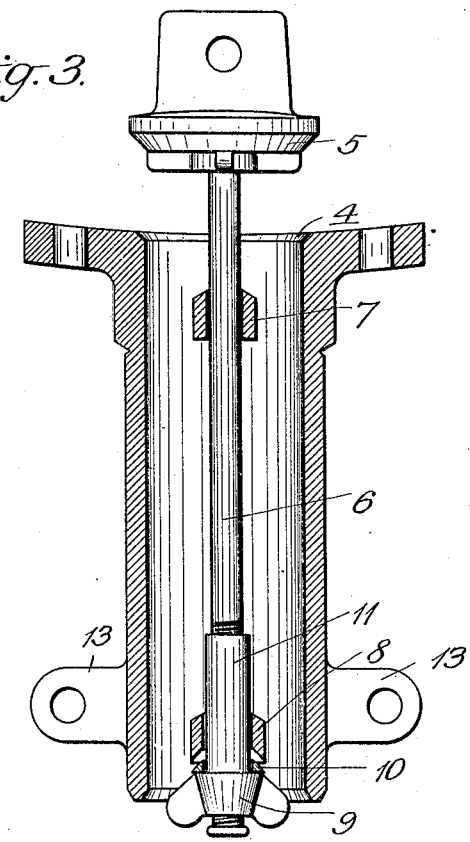
Figure 3 is a vertical section with the flange cap and its connecting means omitted.
Figure 4:
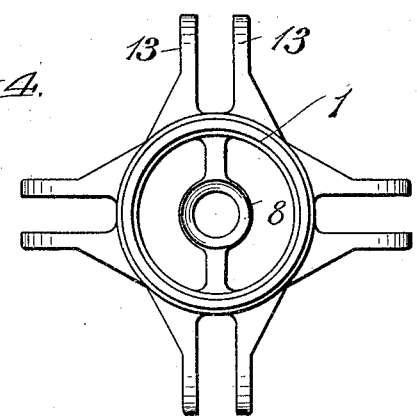
Fig. 4 is a bottom view of the device shown in Fig. 1 with the valve and stem removed.

Referring to the drawings, the device comprises a casing 1 having a flange 2 at one end thereof, provided with holes 3 through which rivets may be placed to attach the casing to a tank car or other similar device. The flanged end of the casing is provided with a valve seat 4. A valve 5 cooperates with the seat 4 and is provided with a stem 6 which extends downwardly through guides 7 and 8 carried in the casing. The lower end of the stem 6 is screw threaded and a winged nut 9 is screwed onto the stem 6. A rounded washer 10 is placed between the nut 9 and the guide 8, as best shown in Figs. 1 and 3. The nut 9 is provided with a sleeve 11 which extends in the direction of the valve. The casing 1 is provided with a break-groove 12 below the upper guide 7. The casing is also provided with four pairs of lugs 13 near the lower end thereof, and bolts 14 are pivoted in the lugs 13, as shown in Fig. 1. The bolts 14 are provided at their lower ends with nuts 15, which engage wings or arms 16 on a flange cap 17. The flange cap 17 is of such shape as to provide a chamber 18 on the interior thereof, which is of such shape as to accommodate the lower end of the stem 6 and the winged nut 9 only when the nut is in the position shown in Fig. 1; that is to say, in such position as to hold the valve 5 seated. When the parts are in the position shown in Fig. 1, the flange cap 17 may be placed over the lower end of the casing and the nuts 15 tightened, thus holding the flange cap tight against the lower end of the casing and sealing the same by means of the gasket 19, which is drawn up tightly against the lower open end of the casing.

The outlet valve above described, when used on a tank car, may be placed between the sills 20 and 21 of the car, and thus protected against such accidents as derailment, wherein the outlet valves of cars are frequently stripped off and the contents of the car lost, and the fire hazard greatly increased. In the arrangement of my device, the entire outlet device is placed between the sills and does not project below the bottom thereof, so that the mechanism is securely protected against accident. The provision of the break-groove 12 permits the casing to be broken at the point, which is below the upper guide 7. This would allow the stem 6 to be bent without breaking the guide and the valve would remain seated although the casing 1 might be broken.

The valve 5 is also provided with a projection 22, to which may be connected the ordinary operating rod leading to the dome of the tank.

My invention has several advantages, among which may be mentioned that by reason of its simplicity and accessibility, one man is able to set it up with an ordinary wrench; the shape of the flange cap is such that the valve must be securely closed before the flange cap can be attached, thus insuring against a leaky valve; the device may be placed between the sills of the car and protected thereby, so as to lessen the accident and fire hazard. Other advantages will be apparent to those skilled in the art.

While I have shown and described one embodiment of my invention in great detail, I desire to be understood that I am not limited to the exact arrangement shown and described, as many changes may be made therein without departing from the spirit of my invention.

I claim:

1. In a discharge valve for tank cars, the combination of a casing having a valve seat at one end, a valve adapted to cooperate with said seat, a stem connected to said valve and provided with screw threads near the end opposite the valve, guides for said stem, a nut on said stem adapted to hold said valve in its seated position, and a closure for the lower end of said casing adapted to accommodate said nut only when said nut is in place to hold said valve in seated position.

2. In a discharge valve for tanks, the combination of a casing provided with a valve seat, a valve cooperating with said seat, a stem connected with the valve extending beyond the end of the casing opposite the valve, means on the stem for holding the valve seated, a cap for the end of the casing opposite the valve seat having a chamber therein for accommodating said stem and holding means only when said means is in position to hold said valve seated.

3. In a discharge valve for tanks, the combination of a casing having a flange for attachment to a tank, guides in said casing, a valve having a screw-threaded stem passing through said guides and projecting beyond the lower end of said casing, a winged nut adapted to be screwed onto said stem and engage the lower guide to hold the valve in seated position, a cap for the lower end of said casing so shaped as to engage said nut except when the nut is in position to hold the valve in the seated position.

4. In a discharge valve for tanks, the combination of a casing having a flange for attachment to a tank, guides in said casing, a valve having a screw-threaded stem passing through said guides and projecting beyond the lower end of said casing, a winged nut adapted to be screwed onto said stem and engage the lower guide to hold the valve in seated position, a cap for the lower end of said casing having a chamber for accommodating said stem and nut when the nut is in position to hold the valve seated, and means for attaching said cap to the casing comprising bolts and cooperating wings with nuts on the bolts for engaging the wings and holding the cap in position.

5. In a discharge device for tanks, the combination of a valve, a seat for said valve, a stem for said valve, means cooperating with the stem for holding the valve on the seat, and closure means independent of the holding means adapted to be placed in position only when said means for holding the valve seated is in holding position.

ABRAM E. SMITH.